United States Patent
Veerepalli et al.

(10) Patent No.: US 9,706,035 B2
(45) Date of Patent: Jul. 11, 2017

(54) METHOD AND APPARATUS FOR SUPPORTING OPERATOR SPECIFIC PROFILES IN WIRELESS COMMUNICATIONS

(75) Inventors: Sivaramakrishna Veerepalli, San Diego, CA (US); Debesh Kumar Sahu, Hyderabad (IN); Tomas Galvez Santaella, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 444 days.

(21) Appl. No.: 13/034,521

(22) Filed: Feb. 24, 2011

(65) Prior Publication Data

US 2011/0314037 A1 Dec. 22, 2011

Related U.S. Application Data

(60) Provisional application No. 61/357,144, filed on Jun. 22, 2010, provisional application No. 61/362,007, filed on Jul. 7, 2010.

(51) Int. Cl.
  *G06F 17/30* (2006.01)
  *H04M 1/725* (2006.01)
  *H04L 29/08* (2006.01)

(52) U.S. Cl.
  CPC .. *H04M 1/72522* (2013.01); *G06F 17/30699* (2013.01); *H04L 67/303* (2013.01); *H04L 67/34* (2013.01); *H04M 1/72525* (2013.01)

(58) Field of Classification Search
  CPC .......... H04M 1/72522; H04M 1/72525; H04L 67/303; H04L 67/34; G06F 17/30699
  (Continued)

(56) References Cited

U.S. PATENT DOCUMENTS 6,016,400 A * 1/2000 Day et al. ...................... 717/175
7,133,924 B1 * 11/2006 Rosenberg et al. ........... 709/231
(Continued)

FOREIGN PATENT DOCUMENTS

CN   101238698 A   8/2008
EP   1710984 A2    10/2006
(Continued)

OTHER PUBLICATIONS

Wikipedia, "user equipment" (Jun. 17, 2010).*
(Continued)

*Primary Examiner* — James Trujillo
*Assistant Examiner* — Hubert Cheung
(74) *Attorney, Agent, or Firm* — James T. Hagler

(57) ABSTRACT

Methods and apparatuses are provided that facilitate providing one or more profiles to an application executing on a device. The application can request one or more profiles, which can relate to an application type. The application type can be specified in the profile request, determined based on a profile indicated in the profile request, etc. Where the application type corresponds to an operator-specific application type, one or more operator identifiers in the profile request can be verified with one or more other operator identifiers in an identity module of the device. Where the operator identifiers match, the requested profile can be provided to the application. Where the operator identifiers do not match, an invalid profile, error code, etc. can be provided to the application. In this regard, operators can control utilization of specific profiles that can be defined by the operator.

17 Claims, 8 Drawing Sheets

(58) Field of Classification Search
USPC .......................................................... 707/758
See application file for complete search history.

(56) References Cited

U.S. PATENT DOCUMENTS

| | | | |
|---|---|---|---|
| 7,263,353 B2* | 8/2007 | Forsberg et al. ............. 455/420 |
| 7,280,822 B2* | 10/2007 | Fraccaroli .................. 455/414.3 |
| 7,650,630 B2 | 1/2010 | Yamada et al. |
| 7,970,390 B2* | 6/2011 | Fraccaroli .................. 455/414.3 |
| 8,041,296 B2* | 10/2011 | Skog et al. .................... 455/41.2 |
| 8,185,088 B2 | 5/2012 | Klein et al. .................... 455/409 |
| 8,769,660 B2* | 7/2014 | Agarwal ............. H04L 63/0281 709/228 |
| 2002/0188736 A1 | 12/2002 | Jarvensivu |
| 2003/0135748 A1* | 7/2003 | Yamada et al. ............... 713/193 |
| 2004/0001433 A1 | 1/2004 | Gram et al. |
| 2004/0002348 A1* | 1/2004 | Fraccaroli .................. 455/456.3 |
| 2004/0052233 A1* | 3/2004 | Skog et al. .................... 370/338 |
| 2006/0199613 A1* | 9/2006 | Almgren ............. H04W 8/183 455/558 |
| 2006/0212537 A1 | 9/2006 | Hans et al. |
| 2007/0004393 A1* | 1/2007 | Forsberg et al. ............. 455/420 |
| 2008/0020704 A1* | 1/2008 | Costa et al. ................. 455/3.06 |
| 2008/0026774 A1* | 1/2008 | Fraccaroli .................. 455/456.3 |
| 2008/0214161 A1* | 9/2008 | Jakl ............................. 455/414.2 |
| 2008/0242312 A1* | 10/2008 | Paulson .................. G01S 19/25 455/456.1 |
| 2009/0082004 A1* | 3/2009 | Duggal et al. ................ 455/419 |
| 2009/0227290 A1* | 9/2009 | Chien ................. G06F 21/6254 455/558 |
| 2010/0003945 A1 | 1/2010 | Primo et al. |
| 2010/0291907 A1* | 11/2010 | MacNaughtan ... G06Q 30/0241 455/414.1 |
| 2011/0086611 A1* | 4/2011 | Klein et al. .................... 455/407 |
| 2011/0195700 A1* | 8/2011 | Kukuchka ............... H04W 8/18 455/422.1 |
| 2012/0040615 A1* | 2/2012 | Auriffeille ............. G06Q 10/10 455/41.2 |
| 2014/0317303 A1* | 10/2014 | Toprani ............... H04L 65/1003 709/227 |

FOREIGN PATENT DOCUMENTS

| | | |
|---|---|---|
| JP | 2003198718 A | 7/2003 |
| JP | 2008244513 A | 10/2008 |
| JP | 2009500887 A | 1/2009 |
| KR | 20030055158 A | 7/2003 |
| KR | 20080019727 A | 3/2008 |
| WO | 2007000636 A2 | 1/2007 |
| WO | 2009042840 A1 | 4/2009 |

OTHER PUBLICATIONS

International Search Report and Written Opinion—PCT/US2011/041518, ISA/EPO—Oct. 6, 2011.
3GPP TS 23.041 V7.0.0; 3rd Generation Partnership Project; Technical Specification Group Terminals; Technical realization of Cell Broadcast Service (CBS), Release 7, (Mar. 2006).

* cited by examiner

METHOD AND APPARATUS FOR SUPPORTING OPERATOR SPECIFIC PROFILES IN WIRELESS COMMUNICATIONS

CLAIM OF PRIORITY UNDER 35 U.S.C. §119

The present Application for Patent claims priority to Provisional Application No. 61/357,144 entitled "METHODS AND APPARATUS FOR SUPPORTING PROFILES WITH OPERATOR SPECIFIC PARAMETERS" filed Jun. 22, 2010, and assigned to the assignee hereof and hereby expressly incorporated by reference herein, and Provisional Application No. 61/362,007 entitled "METHODS AND APPARATUS FOR SUPPORTING OPERATOR SPECIFIC 3GPD USER PROFILES IN OPEN MARKET HANDSETS" filed Jul. 7, 2010, and assigned to the assignee hereof and hereby expressly incorporated by reference herein.

BACKGROUND

Field

The following description relates generally to wireless network communications, and more particularly to operator-specific application profiles.

Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs. Many cellular telephones are able to execute applications with which a user can interact that can utilize one or more services on the cellular telephone.

Various standards have developed to guide device and network implementations, such as multiple third generation partnership project (3GPP), 3GPP2, 3GPP LTE, and/or similar standards. In addition, an open market handset (OMH) initiative has formed to increase the variety of cellular telephones, improve interoperability with standards and network operators, etc., over code division multiple access (CDMA) and/or other networks. In an example, removable user identity modules (R-UIM) are provided by network operators to include user subscription information, network operator information, etc., allowing a user to utilize different cellular telephones with a network operator to which the user subscribes by swapping the R-UIM in the telephones.

Currently, network operators are limited in the ability to provide tailored content and/or applications for devices. While applications can access one or more profiles to utilize certain services on devices (e.g., wireless application protocol (WAP) services, multimedia message service (MMS), etc.), these profiles are generic and useable by substantially any application developer or network operator. In OMH, there are currently 7 predefined application types that can be specified by a profile (e.g., in an elementary file for simple internet protocol user profile parameter extension block), including unspecified, multimedia messaging service (MMS), wireless application protocol (WAP) browser, Java, Terminal, and two reserved types.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, apparatus and methods are described in connection with allowing specification of one or more operator-specific application types in a profile for utilization by one or more applications. For example, upon execution of an application at a device, a profile related to the application, which can specify one or more application types, can be determined. In an example, the profile can specify an operator-specific application type, and the device can accordingly compare an operator identifier received from the application (e.g., along with the profile request) to an operator identifier stored on an identity module related to the device. If the operator identifiers match and the device stores the specified profile, for example, the device can provide the profile to the application. If the device does not have the profile or the operator identifiers do not match, the device can return a profile for an unspecified application type, an invalid profile, an error or null profile, etc.

According to an example, a method for providing operator-specific profiles for utilization by one or more applications is provided including receiving a profile request from an application and discerning that an application type related to the profile request corresponds to an operator-specific application type. The method further includes determining whether one or more operator identifiers specified in the profile request match one or more other operator identifiers stored in an identity module and providing a profile to the application in response to the profile request based at least in part on the determining whether the one or more operator identifiers match the one or more other operator identifiers.

In another aspect, at least one processor configured to provide operator-specific profiles for utilization by one or more applications is provided. The at least one processor includes a first module for receiving a profile request from an application and a second module for discerning that an application type related to the profile request corresponds to an operator-specific application type. The at least one processor also includes a third module for determining whether one or more operator identifiers specified in the profile request match one or more other operator identifiers stored in an identity module and a fourth module for providing a profile to the application in response to the profile request based at least in part on the determining whether the one or more operator identifiers match the one or more other operator.

In yet another aspect, an apparatus for providing operator-specific profiles for utilization by one or more applications is provided that includes means for receiving a profile request from an application and means for discerning that an application type related to the profile request corresponds to an operator-specific application type. The apparatus further includes means for determining whether one or more operator identifiers specified in the profile request match one or more other operator identifiers stored in an identity module and means for providing a profile to the application in response to the profile request based at least in part on the means for determining determining whether the one or more operator identifiers match the one or more other operator identifiers.

Still, in another aspect, a computer-program product for providing operator-specific profiles for utilization by one or more applications is provided including a computer-readable medium having code for causing at least one computer to receive a profile request from an application and code for causing at least one computer to receive a profile request from an application. The computer-readable medium further includes code for causing the at least one computer to determine whether one or more operator identifiers specified in the profile request match one or more other operator identifiers stored in an identity module, as well as code for causing the at least one computer to communicate a profile to the application in response to the profile request based at least in part on whether the one or more operator identifiers match the one or more other operator identifiers.

Moreover, in an aspect, an apparatus for providing operator-specific profiles for utilization by one or more applications is provided that includes a profile request receiving component for obtaining a profile request from an application and an application type determining component for discerning that an application type related to the profile request corresponds to an operator-specific application type. The apparatus further includes an operator verifying component for determining whether one or more operator identifiers specified in the profile request match one or more other operator identifiers stored in an identity module and a profile providing component for communicating a profile to the application in response to the profile request based at least in part on the determining whether the one or more operator identifiers match the one or more other operator identifiers.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
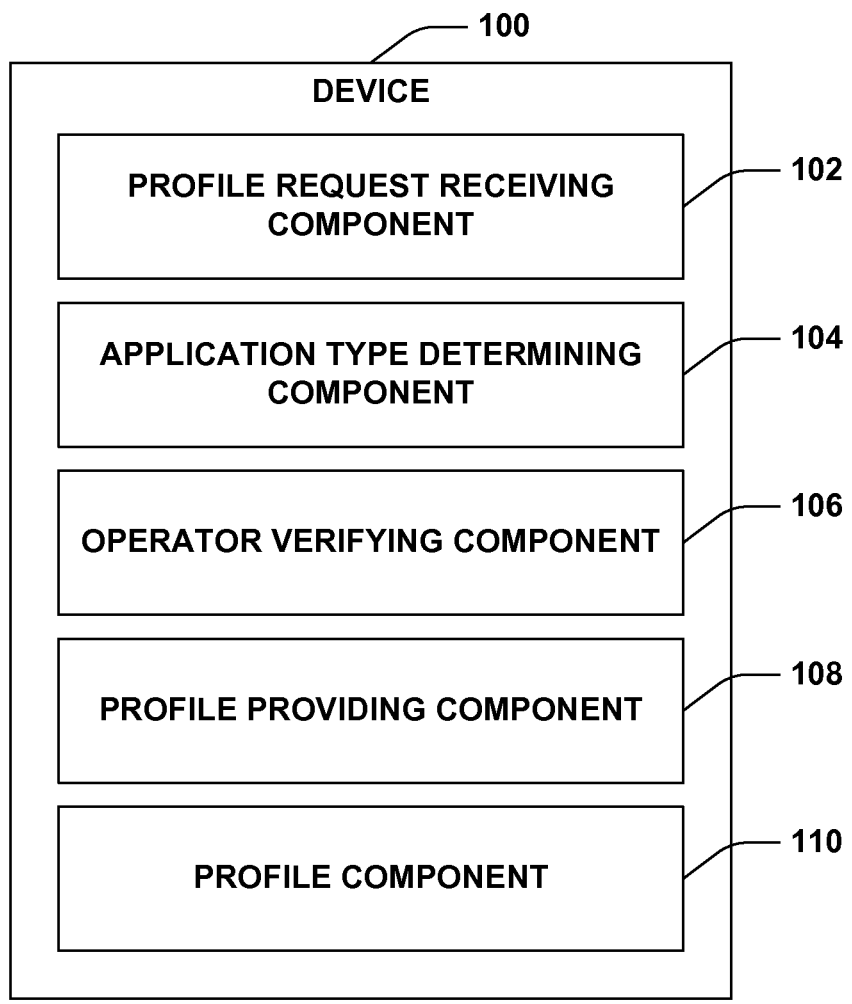
FIG. 1 illustrates an example system for providing a profile to an application.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, applications can request one or more profiles for utilizing services of a device. The profile as specified or as retrieved based on the profile request can have an associated pre-defined or operator-specific application type. Where the profile has an operator-specific application type (e.g. as specified in the profile request or retrieved profile), an operator identifier received from the application (e.g., in the profile request or otherwise) can be compared to an operator identifier in an identity module of the device. If the operator identifiers match, the one or more requested profiles can be provisioned to the application, if stored by the device. Thus, for example, the one or more requested profiles can be implemented and provided by the operator as well, allowing further control and utilization of operator-specific information by one or more applications.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

In FIG. 1, an example device 100 that facilitates providing operator-specific application types for one or more profiles is illustrated. Device 100 can be a UE, modem (or other tethered device), a portion thereof, and/or substantially any device that can communicate in a network. Device 100 can include a profile request receiving component 102 that obtains a profile request for one or more stored profiles, an application type determining component 104 that can receive an application type related to the profile request, and an operator verifying component 106 that can determine, in some instances, whether an operator identifier specified in the profile request matches an operator identifier stored in an identity module. Device 100 also includes a profile providing component 108 that provides a profile based at least in part on the profile request, and a profile component 110 that stores one or more profiles related to at least one of a user of the device 100, an operator with which the user maintains a subscription, and/or the like. For example, device 100 can operate in a network that offers subscription or profile based access to one or more services. For example, device 100 can communicate with one or more components of a cellular network (e.g., 3GPP2, 3GPP, or similar network, etc.), another wireless network (e.g., WiFi), and/or the like, through one or more base stations or other access points (not shown) to access the one or more services. Thus, in one example, profile component 110 can store identity and/or subscription profiles or other information to facilitate accessing the one or more components.

According to an example, profile request receiving component 102 can obtain a profile request for a profile stored by profile component 110. For example, profile component 110 can be or can otherwise include an identity module, such as a removable user identity module (R-UIM) card, subscriber identity module (SIM) card, or other removable or non-removable identifier module or other storage medium. As described, in one example, such identity modules can be portable among devices to provide subscriber, operator, or other information to the devices. An operator can refer to a network operator that provides a network over which device 100 communicates, such as one or more service providers. In addition, a profile can be a data structure including one or more parameters, name/value pairs, and/or the like, that can be utilized to access one or more services on device 100 (e.g., based on a user subscription or otherwise). In an example, profile request receiving component 102 can obtain the profile request for the profile from an application (not shown), which can be executing on device 100, through device 100 (e.g., where device 100 is a tethered device), and/or the like. As described, the profile request can relate to obtaining a profile for a user of device 100 stored by profile component 110 to access one or more subscription-based functionalities of device 100, such as wireless application protocol (WAP), multimedia messaging service (MMS), and/or the like.

In addition, for example, the profile request can relate to obtaining a generic profile for an application type, a specific profile that can have an application type specified in the profile request or not, and/or the like. In one example, the profile request can specify an operator-specific application type. For example, profiles with operator-specific application types can be defined by an operator for use in certain applications that request profiles having that application type. Such profiles, and other profiles for example, and can be stored in profile component 110 or a related identity module. In either case, application type determining component 104 can discern an application type related to the requested profile. In one example, the application type can be specified in the profile request; in another example, application type determining component 104 can locate the requested profile in profile component 110, and can determine whether the profile has an application type that is operator-specific.

Where application type determining component 104 discerns that the requested profile relates to an operator-specific application type, operator verifying component 106 can determine whether one or more operator identifiers specified in the profile request or otherwise received from the application matches one or more similar operator identifiers stored by profile component 110 or another identity component (e.g., that the one or more operators specified in the profile request are equal or at least substantially equal to the one or more similar operator identifiers stored by profile component 110). For example, the operator identifier, as described further herein, can relate to a mobile country code, (MCC), mobile network code (MNC), and/or the like. If the operator identifiers match, profile providing component 108 can communicate the requested profile to the application, which can include retrieving the profile from profile component 110. If profile component 110 does not store the requested profile, profile providing component 108 can communicate a different profile (e.g., a profile related to an unspecified application type) to the application. If the operator identifiers do not match, profile providing component 108 can return a null profile, an error code, etc. to the application. For example, the operator identifiers and profiles can be stored in the same profile component 110 or in different identity modules in device 100 managed by profile component 110 (e.g., R-UIM, SIM, or other user identification module in memory, and/or the like).

Figure 2:
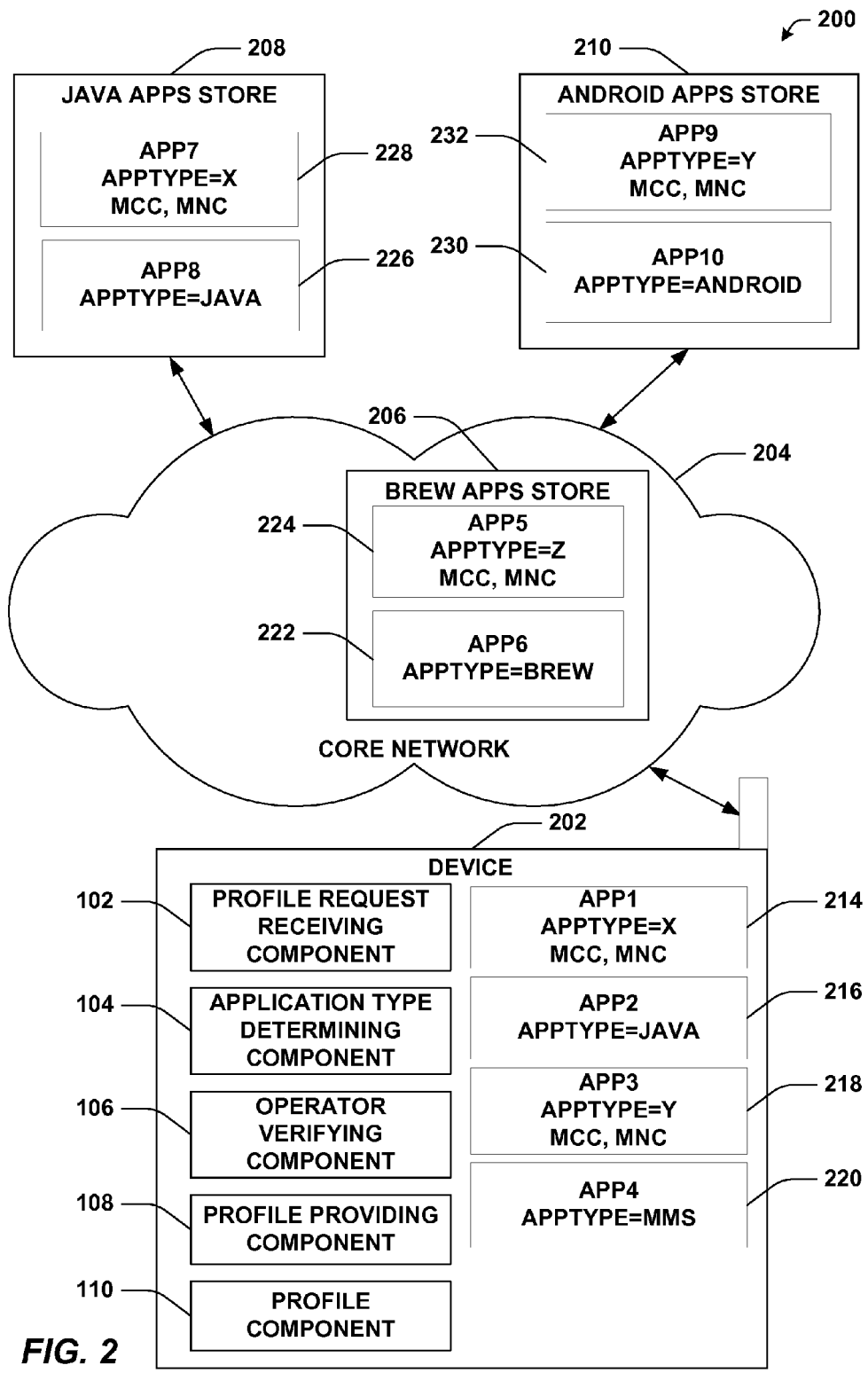
FIG. 2 illustrates an example communication network for allowing applications to request profiles related to operator-specific application types.

With reference to FIG. 2, a block diagram of a communication network 200 according to an aspect is illustrated. Communication network 200 can include device 202 connected to a core network 204 (e.g., a CDMA network, a general packet radio service (GPRS) network, a UMTS network, and other types of wireline and wireless communication networks). Communication network 200 can further include a one or more of servers, such as content servers 206, 208 and 210 (e.g., BREW based application store, Java based application store, ANDROID based application store, etc.), which can be accessed via network 204. As described, device 202 can include a profile request receiving component 102 that obtains a profile request for one or more stored profiles, an application type determining component 104 that can receive an application type of the one or more requested profiles, and an operator verifying component 106 that can determine, in some instances, whether an operator identifier specified in the profile request matches an operator identifier stored in an identity module. Device 202 also includes a profile providing component 108 that provides a profile based at least in part on the profile request, and a profile component 110 that can store (e.g., in a co-located memory) the one or more profiles, which can be user- and/or operator-specific, one or more operator identifiers, and/or the like.

For example, the one or more profiles can apply to the operator and further to subscription information regarding a user related to the profile component 110. The device 202 can utilize the profiles to access core network 204 to provide one or more subscriber services to one or more applications executing on device 202. As described, for example, profile component 110 can be or can include a R-UIM, SIM, or other removable or non-removable identity module or storage medium.

In one aspect, where profile component 110 is a R-UIM, communication network 200 can be operable for use in a CDMA ecosystem in which full-feature R-UIM-based open market devices can be distributed. In one aspect, communication network 200 may use a 3G standard, such as 3GGP2. Currently, 3GPP2 has at least two approved standards C.S0023 Rev D version 1.0 dated Jun. 19, 2009 (Removable User Identity Module for Spread Spectrum Systems) and C.S0065 Rev B version 1.0 dated Jan. 25, 2010 (cdma2000 Application on UICC for Spread Spectrum Systems). In such standards, CDMA ecosystem variables and features are represented by elementary files in a C.S0023 Rev D/C.S0065 Rev A or later card. Further, each elementary file can have a standardized structure and can occupy a portion of profile component 110 (e.g., a memory or other storage medium of an R-UIM, SIM, etc.). Further, C.S0023 Rev D/C.S0065 Rev A or later includes functionality to allow network operators to configure and support different multiple 3GPD user profiles. Still further, support for different multiple 3GPD user profiles can be represented by a modified elementary file (EF), such as simple internet protocol user profile parameters extension (EFSIPUPPExt). An example EFSIPUPPExt is defined in Section 3.4.89 of C.S0023-D v1.0 and includes user profile parameters (UPP), which can have a structure similar to the following:

| Field | Length (bits) |
|---|---|
| NUM_NAI | 4 |

NUM_NAI occurrences of the following fields

| | |
|---|---|
| NAI_ENTRY_INDEX | 4 |
| APPLICATIONS | 32 |
| PRIORITY | 8 |
| DATA_RATE_MODE | 4 |
| DATA_BEARER | 4 |
| RESERVED | 0 or 4 | where NUM_NAI is the number of network address identifier (NAI) entries in the UPP block, NAI_ENTRY_INDEX is an index of a given entry, APPLICATIONS is a bitmask specifying which application types are associated with a specific profile, PRIORITY indicates a priority of an application related to the profile for determining whether to reuse an existing data session with the application, DATA_RATE_MODE indicates a mode for communicating in the application at a certain data rate, and DATA_BEARER indicates a type of data bearer to establish for communicating from the application.

In addition, for example, the APPLICATIONS bit mask can be utilized to specify the following predefined application types for the profile:

| Bit | Application |
|---|---|
| 1 | Unspecified (used by applications not present in any other profile) |
| 2 | MMS |
| 3 | WAP Browser |
| 4 | Reserved |
| 5 | Java |
| 6 | Reserved |
| 7 | Terminal (tethered mode for terminal access) |
| 8-32 | Reserved for future use |

For example, as described herein, at least a portion of bits 8-32 can be reserved for defining operator-specific application types, as described herein. For example, a range within bits 8-32 can be defined as operator-specific, and an operator can utilize bits within the range to define profiles for use in applications developed by or otherwise specific to the operator.

In addition, for example, device 202 can include a plurality of applications 214, 216, 218, and 220 executing on device 202. In one aspect, one or more of the applications can be pre-loaded and/or pre-installed on device 202. In another aspect, the one or more of the applications can be dynamically downloaded to device 202 (e.g., from content servers 206, 208, and/or 210). In either case, applications 214, 216, 218, and 220 can execute on device 202 and can request one or more profiles related to an application type. As described, the profile request can relate to at least one of one or more generic profiles related to a specified application type, one or more specific profiles that can include an application type identifier or not, and/or the like. Profile request receiving component 102 can obtain the profile request, and application type determining component 104 can discern whether the one or more profiles in the profile request correspond to an operator-specific application type. In the previous examples, this can include determining such based on an application type received in the profile request, determining an application type related to a requested profile (e.g., based at least in part on querying profile component 110 for the requested profile), and/or the like.

If an application type of a requested profile is operator-specific, operator verifying component 106 can compare an operator identifier in the profile request to an operator identifier stored by profile component 110. Where the operator identifiers match, profile providing component 108 can retrieve the requested profile from profile component 110, if not done so by application type determining component 104, and can communicate the profile to the application. Where the operator identifiers do not match, profile providing component 108 can return an invalid profile, an error code, etc. to the application. For example, retrieving the requested profile can include analyzing a plurality of profiles stored in the profile component 110 to locate a profile correlated to a profile identifier in the profile request, an application type specified in the request, and/or the like.

For example, APP1 214 can execute and request a profile for application type X, which can be an operator-specific application type. Profile request receiving component 102 can obtain the profile request, which can include the application type and/or an operator identifier. Application type determining component 104 can obtain the application type X from the profile request, and/or can retrieve the application type X based at least in part on retrieving a specific profile from profile component 110 specified in the profile request. Based at least in part on determining that the application type is operator-specific, operator verifying component 106 can compare an operator identifier received in the profile request from APP1 214 with an operator identifier stored by profile component 110.

As described, for example, the operator identifier received from APP1 214 can comprise an MCC, MNC, and/or the like, and operator verifying component 106 can accordingly compare the MCC, MNC, etc. with an MCC, MNC, etc. stored by profile component 110 or another user identity module of device 202. For example, the MCC, MNC, etc. can be stored partly within an international mobile subscriber identifier (IMSI) in the profile component 110 (e.g., an R-UIM, SIM, or other removable or non-removable identity module). Where the operator identifiers match, profile providing component 108 can retrieve the requested profile from profile component 110, and can communicate the requested profile to APP1 214, for example. Where the operator identifiers do not match, for example, profile providing component 108 can communicate an invalid profile, an error code, etc. to APP1 214. Where the operator identifiers match but profile component 110 does not store the requested profile, profile providing component 108 can retrieve a profile stored by profile component 110 that relates to an unspecified application type, and communicate the profile to APP1 214. APP1 214 can utilize the received profile (or error code, etc.) to execute one or more functions, utilizing one or more services, and/or the like, as described.

In another example, APP2 216 can execute and request a profile for a JAVA application type, which can be a predefined application type, as described. In this example, profile request receiving component 102 can obtain the profile request, and application type determining component 104 can determine the profile request is not for a profile of an operator-specific application type based at least in part on determining an application type of JAVA requested by APP2 216, determining an application type of JAVA related to a specific profile stored in profile component 110 requested by APP2 216, etc., as described. Thus, profile providing component 108 can query profile component 110 for the requested predefined profile, and can provide the profile to APP2 216 where stored by profile component 110 (e.g., or a profile for an unspecified application type otherwise). It is to be appreciated that retrieving operator identifiers, profiles, etc. from profile component 110 can include retrieving such from memory of device 202 (not shown) that is populated according to parameter retrieved from profile component 110, retrieving such from a memory within profile component 110, and/or the like.

In one aspect, an operator can define one or more operator-specific application types within a range defined in the APPLICATION bitmask provided in the application information, as described above. For example, the APPLICATION bitmask can be a 32-bit value where at least a portion of bits 8-32 can relate to operator-specific applications, as described. In this regard, an operator can define operator-specific profiles that indicate one or more operator-specific application types within the range to allow the operator to control access to the profiles. This also allows operator developed or related applications to request and utilize the operator-specific profiles that are executing on devices that have an R-UIM with the proper operator identifier. Thus, where application type determining component 104 encounters an APPLICATION bitmask value within the range, application type determining component 104 can determine the corresponding profile has an operator-specific application type, and thus operator verifying component 106 can compare operator identifiers, as described.

In addition, in this regard, the application types defined in the bitmask can be used by multiple operators, and can thus overlap for the different operators. Thus, verifying the operator identifiers upon encountering profiles with operator-specific application types ensures the profiles are applicable to the operator identifier specified by the application. If operator verifying component 106 fails to verify the operator identifier specified by the application with that of the profile component 110, an invalid profile or error code is returned by profile providing component 108, as described. As described, in one aspect, a profile component 110 can be a physically separate medium, such as a R-UIM, SIM, etc., provided by operator that can be inserted into device 202 for utilizing one or more profiles related to a subscriber, operator, etc.

In another aspect, content servers 206, 208 and 210 can further include various applications 222, 224, 226, 228, 230 and 232. In some aspects, there can be at least two types of applications. One type of application can be preloaded and or pre-installed on a device 202. In one aspect, preloaded applications can communicate with a server/gateway located inside core network 204 and can have a specific routing/billing set, etc. A second type of application can be dynamically downloadable from application stores (e.g., 206, 208, 210). This type of application can be developed and/or managed by any one of, or any combination of an operator, an application store administrator, etc. Thus, as depicted, such applications can additionally specify an operator-specific application type to access operator specific profiles (e.g., applications 224, 228, and 232) or can be of a predefined or unspecified type (e.g., applications 222, 226, and 230) that does not access operator-specific profiles. In one aspect, both types of applications can pass an application type, MCC, and/or MNC to profile component 110 in a profile request to profile request receiving component 102 to receive an appropriate 3GPD user profile from profile component 110 or other identity module in device 202.

In one aspect, communication network 200 can be operable to enable usage of various applications. Further, communication network 200 can include applications accessible through various content servers. For example, core network 204 can include a BREW based application store 206, which can have a regular BREW application 222 configured with application type as BREW, which can be a predefined application type. In another aspect, BREW based application store 206 can include a new BREW application 224 configured with application type as Z, which can be an operator-specific type, and MCC and MNC of the operator. In another example, a JAVA application store 208 can be connected to network 204 (e.g., through internet protocol (IP) connection) and can be located outside an operator's network. In one aspect, JAVA application store 208 can include a regular JAVA application 226 configured with application type as JAVA (as defined in C.S0023 Rev D/C.S0065 Rev A or later), which can be a predefined application type. In another aspect, JAVA application store 208 can include a new JAVA application 228 configured with application type as X, which can be an operator-specific application type, and MCC and MNC of the operator. In still another example, an ANDROID application store 210 can be connected to network 204 (e.g., through IP connection) and may be located outside an operator's network. In one aspect, ANDROID application store 210 can include a regular ANDROID application 230 configured with application type as ANDROID, which can be a predefined or otherwise non-operator-specific application type. In another aspect, ANDROID application store 210 can include a new ANDROID application 232 configured with application type as Y, which can be an operator-specific application type, and MCC and MNC of the operator. In any case, device 202 can download the applications, which can execute similarly to applications 214 and 216 described above with respect to specifying a profile with an operator-specific or predefined application type.

Figure 3:
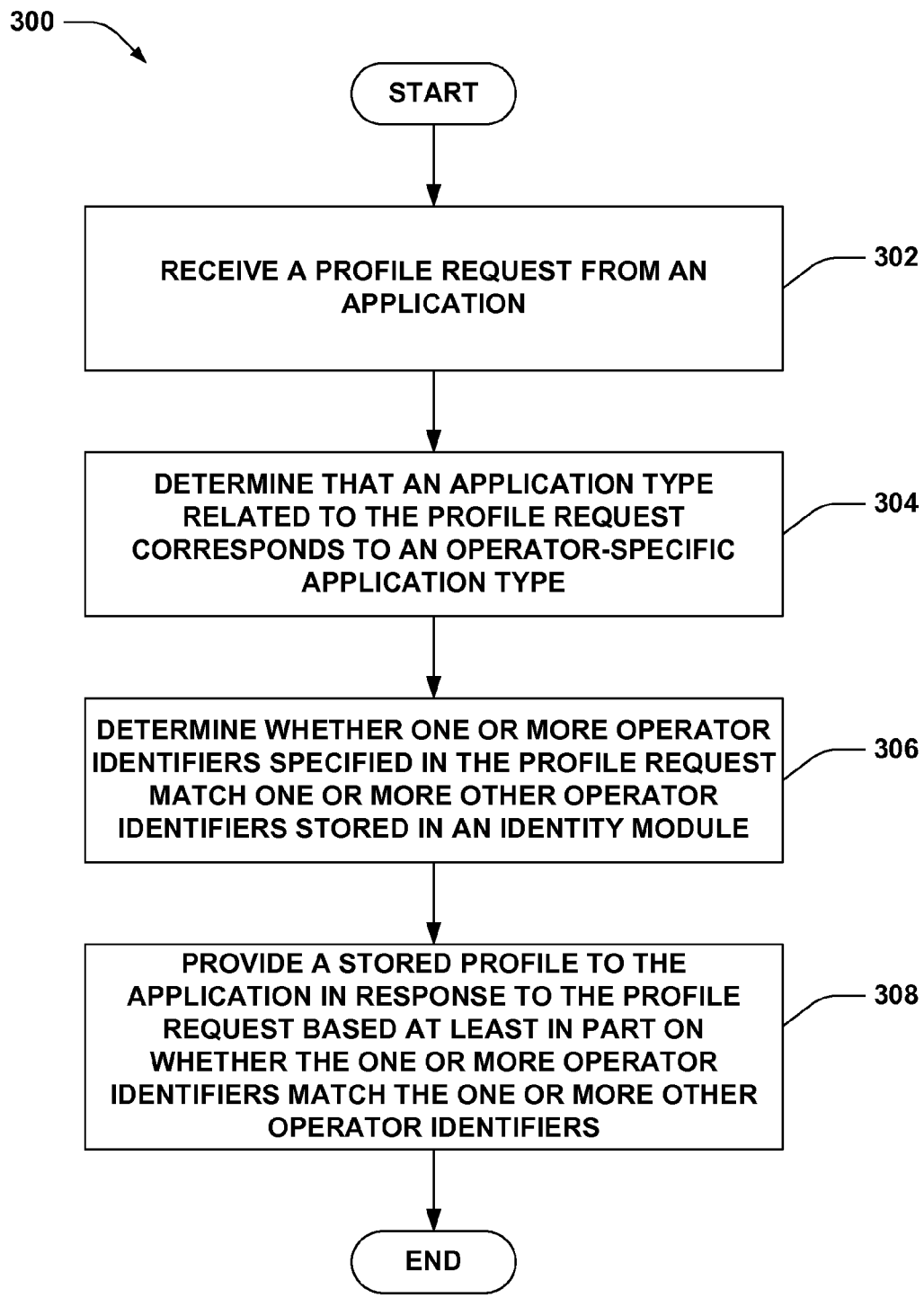
FIG. 3 illustrates an example methodology that provides a profile to an application based on determining a profile request relates to an operator-specific application type.
Figure 4:
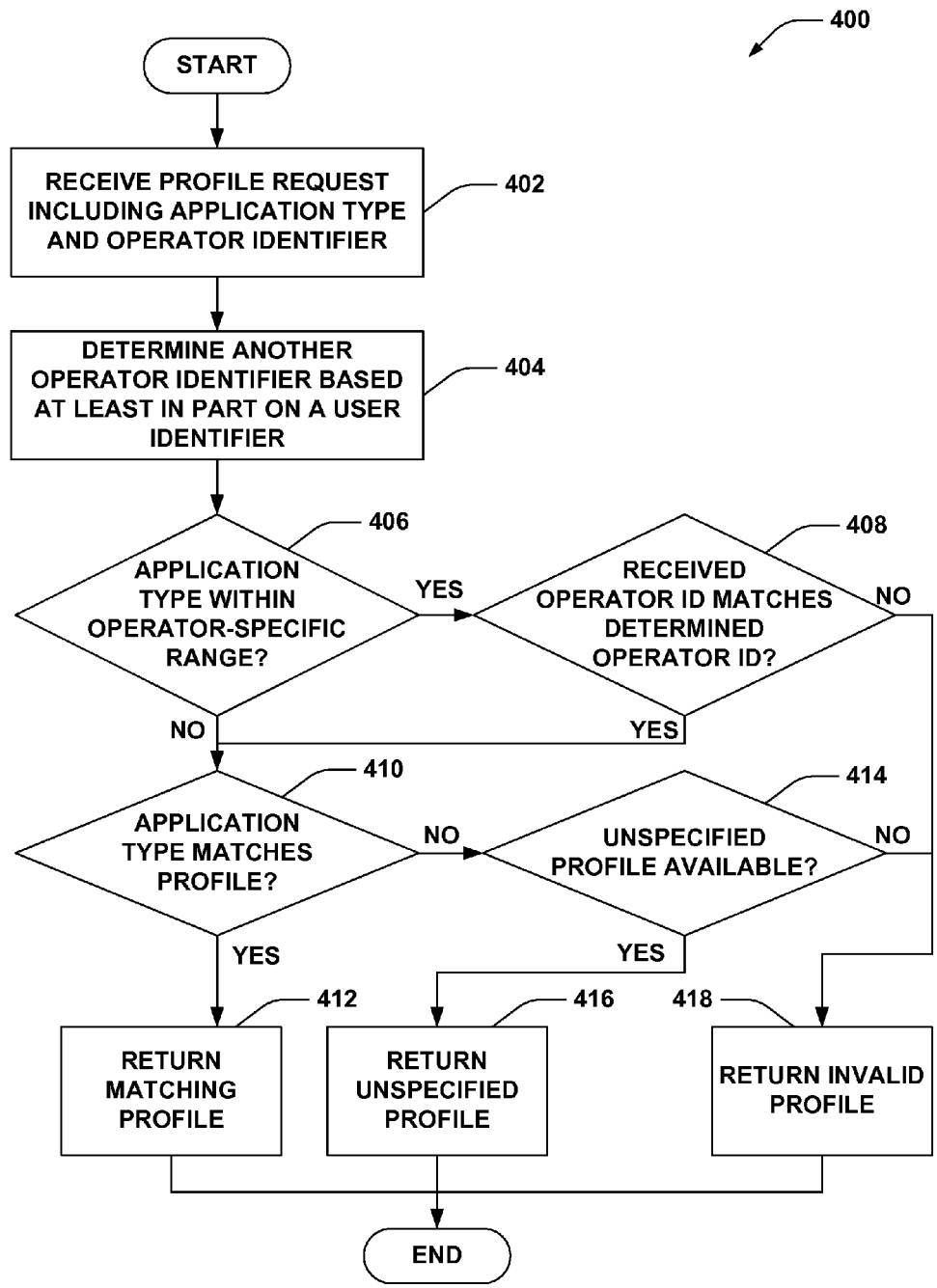
FIG. 4 illustrates an example methodology that provides a profile to an application based on a related application type.

Referring to FIGS. 3-4, example methodologies relating to providing a profile to an application are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more aspects.

Referring to FIG. 3, an example methodology 300 is displayed that facilitates providing a profile to an application. At 302, a profile request can be received from an application. For example, the requested profile can relate to a 3GPD or similar profile. At 304, it can be determined that an application type related to the profile request corresponds to an operator-specific application type. For example, this can be specified in the profile request (e.g., in a definition of the profile or otherwise), determined from a stored profile that corresponds to the profile request, and/or the like, as described. In addition, this can be determined based at least in part on determining that the application type related to the profile is within a range of application types reserved for operator-specific application types, in one example. At 306, it can be determined whether one or more operator identifiers specified in the profile request match one or more other operator identifiers stored in an identity module. As described, this can be based on determining that the application type is operator-specific.

The operator identifiers can relate to an MCC, MNC, and/or other parameters specified in a user identifier (e.g., an IMSI, etc.), and/or the like. Moreover, the identity module can be an R-UIM, or other identity module. At 308, a stored profile can be provided to the application in response to the profile request based at least in part on whether the one or more operator identifiers match the one or more other operator identifiers. For example, where the operator identifiers match, the requested profile can be provided to the application. Where the operator identifiers do not match, a profile for an unspecified application type, an invalid profile, a null profile, an error code, etc. can be provided to the application.

Turning to FIG. 4, an example methodology 400 is displayed that facilitates providing one or more profiles to an application based on a request. At 402, a profile request can be received including an application type and an operator identifier. For example, the request can be for a 3GPD or similar profile for utilization by an application. At 404, another operator identifier can be determined based at least in part on a user identifier. For example, the user identifier can be retrieved from an R-UIM or other identity module, and can include at least one or more operator identifying parameters, such as an MCC, MNC, etc. At 406, it can be determined whether the application type is within an operator-specific range. For example, a range or selection of application types usable in a profile can be reserved for operator-specific applications; thus, at 406, it can be determined whether the specified application type is within the range or selection.

If the application type is within operator specific range, at 408, it can be determined whether the received operator identifier matches the determined operator identifier. If so, then at 410, it can be determined whether the application type matches that of an available profile. If so, the matching profile can be returned at 412. Similarly, if the application type is not within the operator-specific range at 406, it can be determined, at 410, whether the application type matches that of an available profile, and if so, a matching profile can be returned at 412. In either case, if the application type does not match one of an available profile, it can be determined whether a profile for an unspecified application type is available at 414. If so, at 416, the unspecified profile can be returned. If not, at 418, an invalid profile can be returned. At 408, if the received operator identifier does not match the determined operator identifier, an invalid profile can similarly be returned at 418 in this example. Moreover, it is to be appreciated that some steps can occur in different orders and such modifications are intended to be covered by subject matter disclosed herein. For example, step 404 can instead, in one example, be performed after the determination of step 406.

Figure 5:
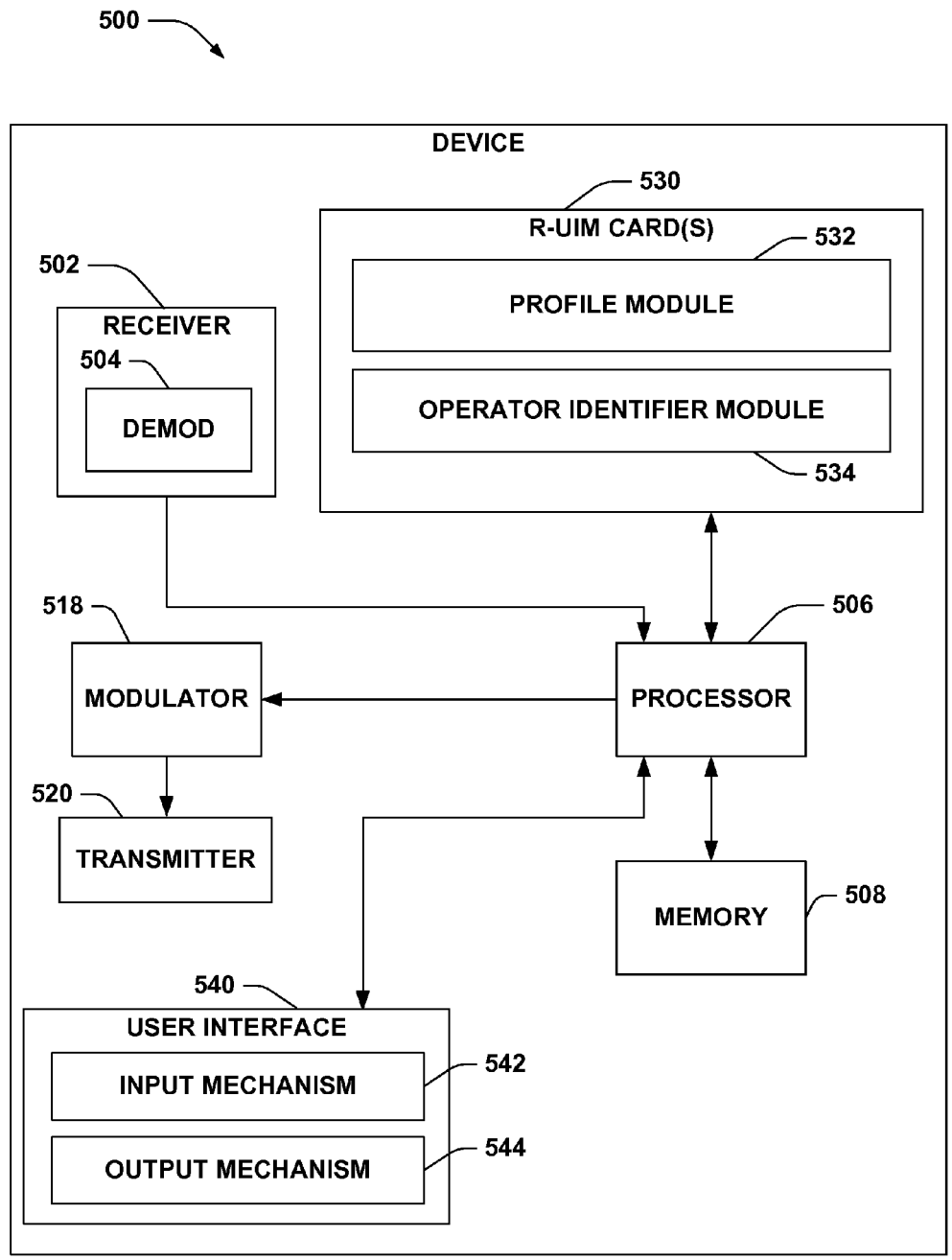
FIG. 5 illustrates an example mobile device according to aspects described herein.

FIG. 5 illustrates an example architecture of a device 500. Device 500 comprises receiver 502 that receives a signal from, for instance, a receive antenna (not shown), performs typical actions on (e.g., filters, amplifies, downconverts, etc.) the received signal, and digitizes the conditioned signal to obtain samples. Receiver 502 can comprise a demodulator 504 that can demodulate received symbols and provide them to processor 506 for channel estimation. Processor 506 can be a processor dedicated to analyzing information received by receiver 502 and/or generating information for transmission by transmitter 520, a processor that controls one or more components of device 500, and/or a processor that both analyzes information received by receiver 502, generates information for transmission by transmitter 520, and controls one or more components of device 500. For example, processor 506 can execute or interface with one or more components or applications described herein, such as in FIGS. 1-2, and/or can perform one or more methods described herein, such as in FIGS. 3-4, etc.

Device 500 can additionally comprise memory 508 that is operatively coupled to processor 506 and that can store data to be transmitted, received data, information related to available channels, data associated with analyzed signal and/or interference strength, information related to an assigned channel, power, rate, or the like, and any other suitable information for estimating a channel and communicating via the channel. Memory 508 can additionally store protocols and/or algorithms associated with estimating and/or utilizing a channel (e.g., performance based, capacity based, etc.). In an example, memory 508 can comprise instructions for the components or methods, and/or execution thereof, as described herein.

It will be appreciated that data store (e.g., memory 508) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 508 of the subject systems and methods may comprise, without being limited to, these and any other suitable types of memory.

One or more R-UIM cards 530 can also be employed by device 500 to utilize one or more subscriptions provided by one or more operators. In one aspect, R-UIM card 530 can include a profile module 532 and an identifier module 534. Further, profile module 532 can include one or more profiles for utilization with one or more applications, as described previously, where the one or more profiles can specify a predefined or operator-specific application type. In one aspect, identifier module 534 can include an IMSI of a subscriber, which can include an MCC and MNC related to an operator, and other user information. In one example, use of the MCC and MNC information can enable an operator to utilize a defined operator-specific application type within an operator-specific range for defining one or more profiles that can be accessed by one or more applications, as described above.

Additionally, device 500 can include user interface 540. User interface 540 can include input mechanisms 542 for generating inputs into device 500, and output mechanism 544 for generating information for consumption by the user of the device 500. For example, input mechanism 542 can include or be interfaced to a mechanism such as a key or keyboard, a mouse, a touch-screen display, a microphone, etc. Further, for example, output mechanism 544 can include or can be interfaced to a display, an audio speaker, a haptic feedback mechanism, a Personal Area Network (PAN) transceiver, etc. In the illustrated aspects, the output mechanism 544 can include a display operable to present media content in image or video format or an audio speaker to present media content in audio format.

It will be appreciated that, in accordance with one or more aspects described herein, inferences can be made regarding determining whether an application type is in an operator-specific range, selecting a profile for providing to an application, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 6:
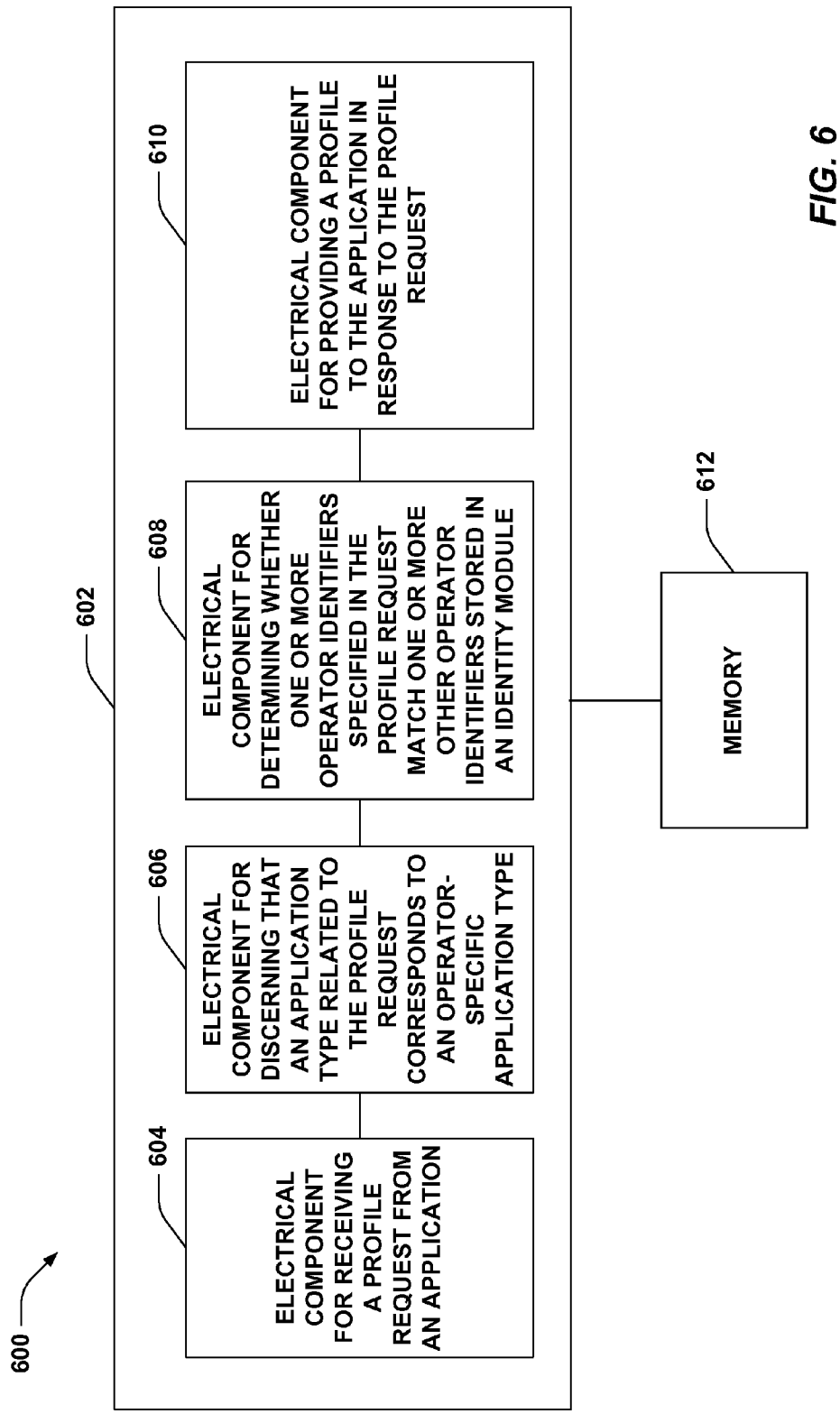
FIG. 6 illustrates an example system for providing a profile to an application based at least in part on determining an application type related to a requested profile.

With reference to FIG. 6, illustrated is a system 600 that provides one or more profiles to an application. For example, system 600 can reside at least partially within a mobile device, tethered device, etc. It is to be appreciated that system 600 is represented as including functional blocks, which can be functional blocks that represent functions implemented by a processor, software, or combination thereof (e.g., firmware). System 600 includes a logical grouping 602 of electrical components that can act in conjunction. For instance, logical grouping 602 can include an electrical component for receiving a profile request from an application 604. As described, the profile request can relate to a 3GPD or similar profile that allows the application to utilize on or more services provided by an operator, such as WAP, MMS, etc.

Further, logical grouping 602 can comprise an electrical component for discerning that an application type related to the profile request corresponds to an operator-specific application type 606. For example, the application type can be specified in the profile request, in a stored profile determined based at least in part on the profile request, etc. Allowing specification of operator-specific application types, as described, not only allows returning of an operator specified profile, but also allows an operator to be verified to permit utilizing overlapping application types. In addition, logical grouping 602 can comprise an electrical component for determining whether one or more operator identifiers specified in the profile request match one or more other operator identifiers stored in an identity module 608. As described, the identity module can be an R-UIM or similar user module that includes subscriber information, such as an IMSI, etc.

Moreover, logical grouping 602 can include an electrical component for providing a profile to the application in response to the profile request 610. This can be based at least in part on electrical component 608 determining whether the one or more operator identifiers match the one or more other operator identifiers. For example, where electrical component 608 determines that the one or more operator identifiers received through profile request match the one or more other operator identifiers based in an identity module, electrical component 610 can provide the requested profile to the application. Where the operator identifiers do not match, electrical component 610 can return an invalid profile, an error code, etc. For example, electrical component 604, in an aspect, can include a profile request receiving component 102. Furthermore, electrical component 606, in an aspect, can include an application type determining component 104. In another example, electrical component 608 can include an operator verifying component 106, and/or electrical component 610 can include a profile providing component 108. Additionally, system 600 can include a memory 612 that retains instructions for executing functions associated with the electrical components 604, 606, 608, and 610. While shown as being external to memory 612, it is to be understood that one or more of the electrical components 604, 606, 608, and 610 can exist within memory 612. In yet another example, at least a portion of memory 612 can include or can be implemented within an R-UIM or similar identity module.

In one example, electrical components 604, 606, 608, and 610 can comprise at least one processor, or each electrical component 604, 606, 608, and 610 can be a corresponding module of at least one processor. Moreover, in an additional or alternative example, electrical components 604, 606, 608, and 610 can be a computer program product comprising a computer readable medium, where each electrical component 604, 606, 608, and 610 can be corresponding code.

Figure 7:
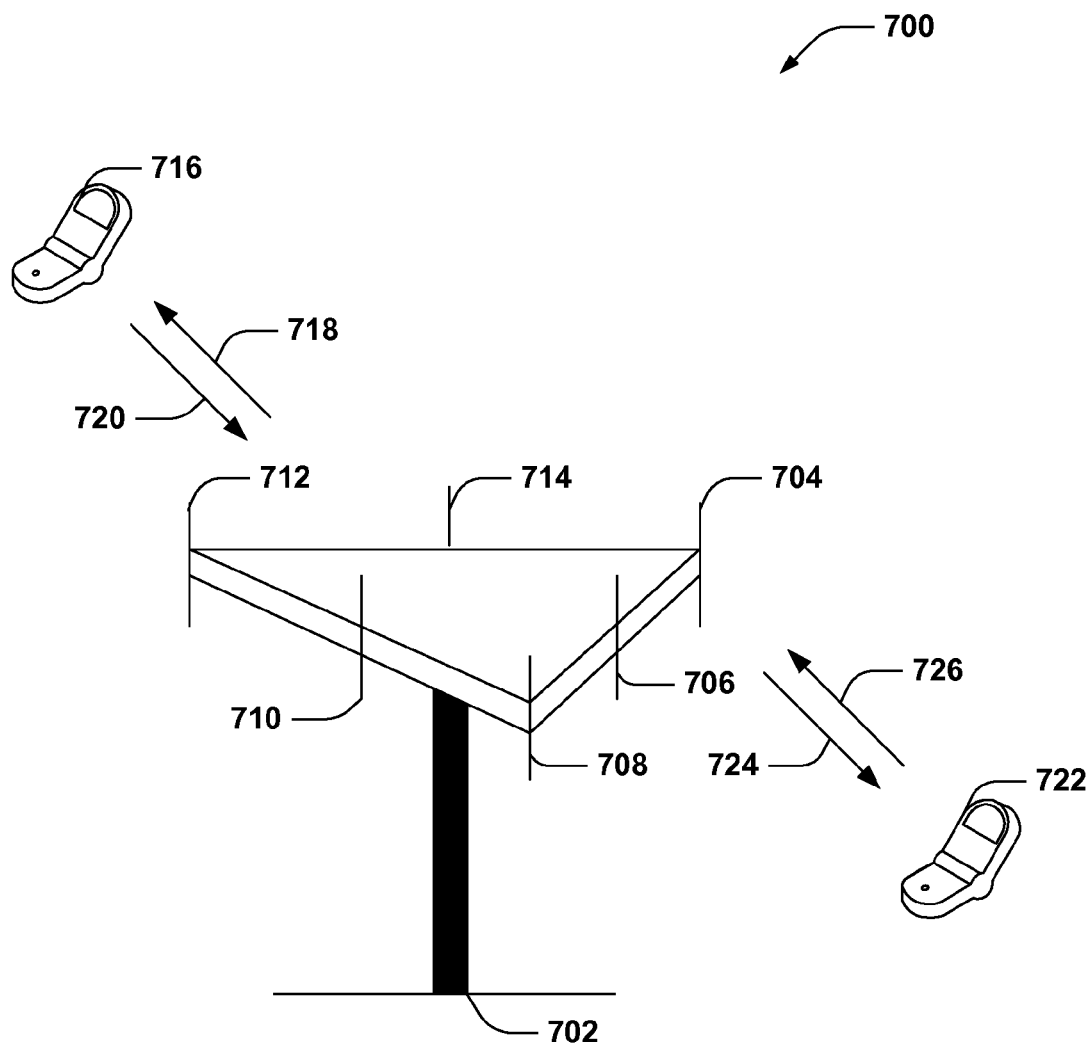
FIG. 7 illustrates an example wireless communication system in accordance with various aspects set forth herein.

Referring now to FIG. 7, an example wireless communication system 700 is illustrated in accordance with various aspects presented herein. System 700 comprises a base station 702 that can include multiple antenna groups. For example, one antenna group can include antennas 704 and 706, another group can comprise antennas 708 and 710, and an additional group can include antennas 712 and 714. Two antennas are illustrated for each antenna group; however, more or fewer antennas can be utilized for each group. Base station 702 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 702 can communicate with one or more mobile devices such as mobile device 716 and mobile device 722; however, it is to be appreciated that base station 702 can communicate with substantially any number of mobile devices similar to mobile devices 716 and 722. Mobile devices 716 and 722 can be, for example, cellular phones, smart phones, laptops, handheld communication devices, handheld computing devices, satellite radios, global positioning systems, PDAs, and/or any other suitable device for communicating over wireless communication system 700. As depicted, mobile device 716 is in communication with antennas 712 and 714, where antennas 712 and 714 transmit information to mobile device 716 over a forward link 718 and receive information from mobile device 716 over a reverse link 720. Moreover, mobile device 722 is in communication with antennas 704 and 706, where antennas 704 and 706 transmit information to mobile device 722 over a forward link 724 and receive information from mobile device 722 over a reverse link 726. In a frequency division duplex (FDD) system, forward link 718 can utilize a different frequency band than that used by reverse link 720, and forward link 724 can employ a different frequency band than that employed by reverse link 726, for example. Further, in a time division duplex (TDD) system, forward link 718 and reverse link 720 can utilize a common frequency band and forward link 724 and reverse link 726 can utilize a common frequency band.

Each group of antennas and/or the area in which they are designated to communicate can be referred to as a sector of base station 702. For example, antenna groups can be designed to communicate to mobile devices in a sector of the areas covered by base station 702. In communication over forward links 718 and 724, the transmitting antennas of base station 702 can utilize beamforming to improve signal-to-noise ratio of forward links 718 and 724 for mobile devices 716 and 722. Also, while base station 702 utilizes beamforming to transmit to mobile devices 716 and 722 scattered randomly through an associated coverage, mobile devices in neighboring cells can be subject to less interference as compared to a base station transmitting through a single antenna to all its mobile devices. Moreover, mobile devices 716 and 722 can communicate directly with one another using a peer-to-peer or ad hoc technology as depicted. According to an example, system 700 can be a multiple-input multiple-output (MIMO) communication system. It is to be appreciated that various other wireless communication systems can be employed in accordance with aspects described herein.

Figure 8:
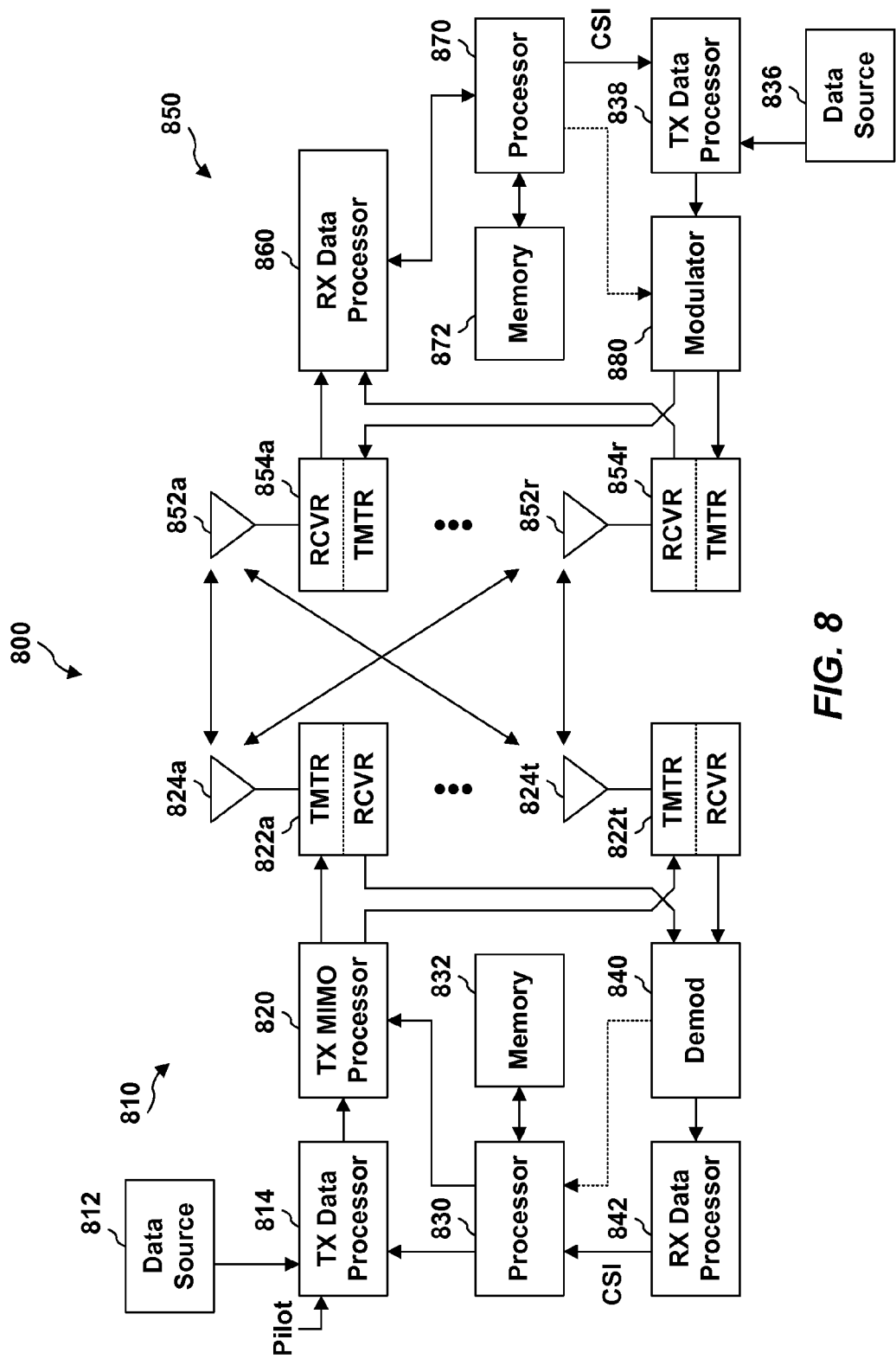
FIG. 8 illustrates an example wireless network environment that can be employed in conjunction with the various systems and methodologies described herein.

FIG. 8 shows an example wireless communication system 800. The wireless communication system 800 depicts one base station 810 and one mobile device 850 for sake of brevity. However, it is to be appreciated that system 800 can include more than one base station and/or more than one mobile device, wherein additional base stations and/or mobile devices can be substantially similar or different from example base station 810 and mobile device 850 described below. In addition, it is to be appreciated that base station 810 and/or mobile device 850 can employ the systems (FIGS. 1-2 and 6-7), mobile devices, (FIG. 5), and/or methods (FIGS. 3-4) described herein to facilitate wireless communication there between. For example, components or functions of the systems and/or methods described herein can be part of a memory 832 and/or 872 or processors 830 and/or 870 described below, and/or can be executed by processors 830 and/or 870 to perform the disclosed functions.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various aspects, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At mobile device 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from mobile device 850 are received by antennas 824, conditioned by receivers 822, demodulated by a demodulator 840, and processed by a RX data processor 842 to extract the reverse link message transmitted by mobile device 850. Further, processor 830 can process the extracted message to determine which precoding matrix to use for determining the beamforming weights.

Processors 830 and 870 can direct (e.g., control, coordinate, manage, etc.) operation at base station 810 and mobile device 850, respectively. Respective processors 830 and 870 can be associated with memory 832 and 872 that store program codes and data. Processors 830 and 870 can also perform computations to derive frequency and impulse response estimates for the uplink and downlink, respectively.

The various illustrative logics, logical blocks, modules, components, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects, it should be noted that various changes and modifications could be made herein without departing from the scope of the described aspects as defined by the appended claims. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise.

What is claimed is:

1. A method for providing operator-specific profiles for utilization by one or more applications, comprising:
receiving, internally within a user equipment (UE), a profile request from an application operating on the UE, the profile request including an application type and a first operator identifier corresponding to a first mobile country code (MCC), a first mobile network code (MNC), and one or more parameters specified in a user identifier;

determining a second operator identifier based on the user identifier, the user identifier being stored in an identity module removably fixed to the UE and including a second MCC and a second MNC;

determining whether the application type of the profile request corresponds to one or more operator-specific application types, the operator-specific profiles indicating the one or more operator-specific application types within a portion of a range of bits defined in a bitmask to allow an operator to control access to the operator-specific profiles, the portion of the range of bits corresponding to operator-specific applications;

determining whether the first operator identifier matches the second operator identifier in response to a determination that the application type is within the portion of the range of bits reserved for the one or more operator-specific application types;

determining whether the application type matches an application type of an available profile in response to at least one of a determination that the application type is not within the portion of the range of bits reserved for the one or more operator-specific application types or a determination that the first operator identifier matches the second operator identifier; and providing a matching profile to the application in response to a determination that the application type matches the application type of the available profile, the matching profile corresponding to an operator-specific profile of the operator-specific profiles.

2. The method of claim 1, wherein the identity module is a removable user identity module for an open market handset.

3. The method of claim 1, further comprising:

determining whether a profile for an unspecified application type is available in response to a determination that the application type does not match the available profile, the profile for the unspecified application type corresponding to one or more profiles not located in a memory;

providing an unspecified profile to the application in response to a determination that the profile for the unspecified application type is available; and providing an invalid profile to the application in response to a determination that the profile for the unspecified application type is not available.

4. The method of claim 1, wherein determining whether the first operator identifier matches the second operator identifier includes determining whether the first MCC matches the second MCC and determining whether the first MNC matches the second MNC.

5. The method of claim 1, wherein the application type corresponds to at least one of unspecified, multimedia messaging service (MMS), wireless application protocol (WAP) browser, first reserved, Java, second reserved, or terminal.

6. The method of claim 1, wherein the range of bits are further defined as an operator-specific range of bits reserved for an operator to define one or more profiles corresponding to at least one or both of applications developed by the operator or applications specific to the operator.

7. An apparatus configured to provide operator-specific profiles for utilization by one or more applications, comprising:

a memory storing executable instructions; and a processor in communication with the memory, wherein the processor is configured to execute the instructions to:

receive, internally within a user equipment (UE), a profile request from an application operating on the UE, the profile request including an application type and a first operator identifier corresponding to a first mobile country code (MCC), a first mobile network code (MNC), and one or more parameters specified in a user identifier;

determine a second operator identifier based on the user identifier, the user identifier being stored in an identity module removably fixed to the UE and including a second MCC and a second MNC;

determine whether the application type of the profile request corresponds to one or more operator-specific application types, the operator-specific profiles indicating the one or more operator-specific application types within a portion of a range of bits defined in a bitmask to allow an operator to control access to the operator-specific profiles, the portion of the range of bits corresponding to operator-specific applications;

determine whether the first operator identifier matches the second operator identifier in response to a determination that the application type is within the portion of the range of bits reserved for the one or more operator-specific application types;

determine whether the application type matches an application type of an available profile in response to at least one of a determination that the application type is not within the portion of the range of bits reserved for the one or more operator-specific application types or a determination that the first operator identifier matches the second operator identifier; and provide a matching profile to the application in response to a determination that the application type matches the application type of the available profile, the matching profile corresponding to an operator-specific profile of the operator-specific profiles.

8. The apparatus of claim 7, wherein the identity module is a removable user identity module for an open market handset.

9. The apparatus of claim 7, wherein the processor is further configured to:

determine whether a profile for an unspecified application type is available in response to a determination that the application type does not match the available profile, the profile for the unspecified application type corresponding to one or more profiles not located in a memory;

provide an unspecified profile to the application in response to a determination that the profile for the unspecified application type is available; and provide an invalid profile to the application in response to a determination that the profile for the unspecified application type is not available.

10. The apparatus of claim 7, wherein the processor configured to determine whether the first operator identifier matches the second operator identifier is further configured to determine whether the first MCC matches the second MCC and determine whether the second MNC matches the second MNC.

11. The apparatus of claim 7, wherein the application type corresponds to at least one of unspecified, multimedia messaging service (MMS), wireless application protocol (WAP) browser, first reserved, Java, second reserved, or terminal.

12. A non-transitory computer-readable medium storing computer executable code for providing operator-specific profiles for utilization by one or more applications, comprising:
- code for receiving, internally within a user equipment (UE), a profile request from an application operating on the UE, the profile request including an application type and a first operator identifier corresponding to a first mobile country code (MCC), a first mobile network code (MNC), and one or more parameters specified in a user identifier;
- code for determining a second operator identifier based on the user identifier, the user identifier being stored in an identity module removably fixed to the UE and including a second MCC and a second MNC;
- code for determining whether the application type of the profile request corresponds to one or more operator-specific application types, the operator-specific profiles indicating the one or more operator-specific application types within a portion of a range of bits defined in a bitmask to allow an operator to control access to the operator-specific profiles, the portion of the range of bits corresponding to operator-specific applications;
- code for determining whether the first operator identifier matches the second operator identifier in response to a determination that the application type is within the portion of the range of bits reserved for the one or more operator-specific application types;
- code for determining whether the application type matches an application type of an available profile in response to at least one of a determination that the application type is not within the portion of the range of bits reserved for the one or more operator-specific application types or a determination that the first operator identifier matches the second operator identifier; and
- code for providing a profile to the application in response to a determination that the application type matches the application type of the available profile, the matching profile corresponding to an operator-specific profile of the operator-specific profiles.

13. An apparatus for providing operator-specific profiles for utilization by one or more applications, comprising:
- a profile request receiving structural component configured to obtain, internally within a user equipment (UE), a profile request from an application operating on the UE, the profile request including an application type and a first operator identifier corresponding to a first mobile country code (MCC), a first mobile network code (MNC), and one or more parameters specified in a user identifier;
- an operator verifying structural component configured to determine a second operator identifier based on the user identifier, the user identifier being stored in an identity module removably fixed to the UE and including a second MCC and a second MNC;
- an application type determining structural component configured to determine whether the application type of the profile request corresponds to one or more operator-specific application types, the operator-specific profiles indicating the one or more operator-specific application types within a portion of a range of bits defined in a bitmask to allow an operator to control access to the operator-specific profiles, the portion of the range of bits corresponding to operator-specific applications;
- wherein the operator verifying structural component is further configured to determine whether the first operator identifier matches the second operator identifier in response to a determination that the application type is within the portion of the range of bits reserved for the one or more operator-specific application types;
- wherein the application type determining structural component is further configured to determine whether the application type matches an application type of an available profile in response to at least one of a determination that the application type is not within the portion of the range of bits reserved for the one or more operator-specific application types or a determination that the first operator identifier matches the second operator identifier; and
- a profile providing structural component configured to provide a profile to the application in response to a determination that the application type matches the application type of the available profile, the matching profile corresponding to an operator-specific profile of the operator-specific profiles.

14. The apparatus of claim 13, wherein the identity module is a removable user identity module for an open market handset.

15. The apparatus of claim 13, wherein the application type determining structural component is further configured to:
- determine whether a profile for an unspecified application type is available in response to a determination that the application type does not match the available profile, the profile for the unspecified application type corresponding to one or more profiles not located in the memory; and
- a profile providing structural component configured to:
    - provide an unspecified profile to the application in response to a determination that the profile for the unspecified application type is available; and
    - provide an invalid profile to the application in response to a determination that the profile for the unspecified application type is not available.

16. The apparatus of claim 13, wherein the operator verifying structural component is further configured to determine whether the first operator identifier matches the second operator identifier is further configured to determine whether the first MCC matches the second MCC and determine whether the second MNC matches the second MNC.

17. The apparatus of claim 13, wherein the application type corresponds to at least one of unspecified, multimedia messaging service (MMS), wireless application protocol (WAP) browser, first reserved, Java, second reserved, or terminal.

* * * * *